(12) United States Patent
Huang et al.

(10) Patent No.: US 8,533,310 B2
(45) Date of Patent: Sep. 10, 2013

(54) METHOD AND APPARATUS FOR ACCELERATION BY PREFETCHING ASSOCIATED OBJECTS

(75) Inventors: Charles Huang, Palo Alto, CA (US); Nitin Gupta, Fremont, CA (US); Vivasvat Keswani, Fremont, CA (US); Bart Robinson, Richmond, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 678 days.

(21) Appl. No.: 12/044,861

(22) Filed: Mar. 7, 2008

(65) Prior Publication Data

US 2008/0222244 A1    Sep. 11, 2008

Related U.S. Application Data

(60) Provisional application No. 60/894,180, filed on Mar. 9, 2007.

(51) Int. Cl.
*G06F 15/173* (2006.01)
*G06F 15/16* (2006.01)
*G06F 9/34* (2006.01)

(52) U.S. Cl.
USPC ............ 709/223; 709/219; 709/246; 711/213

(58) Field of Classification Search
USPC ............ 709/217–229, 246; 707/10; 711/213
See application file for complete search history.

(56) References Cited

U.S. PATENT DOCUMENTS

| 5,754,774 A | 5/1998 | Bittinger et al. |
| 6,178,461 B1 | 1/2001 | Chan et al. |

(Continued)

FOREIGN PATENT DOCUMENTS

| JP | 2002/359649 A | 12/2002 |
| JP | 2004/254039 A | 9/2004 |

(Continued)

OTHER PUBLICATIONS

PCT International Search Report for PCT Appln No. US 08/56431; mailed Aug. 6, 2008 (3 pages).

(Continued)

*Primary Examiner* — Ian N Moore
*Assistant Examiner* — Kiet Tang
(74) *Attorney, Agent, or Firm* — Philip H. Albert; Davis Wright Tremaine, LLP

(57) ABSTRACT

Association information is used to build association trees to associate base pages and embedded objects at a proxy. An association tree has a root node containing a URL for a base page, and zero or more leaf nodes each containing a URL for an embedded object. In most cases, an association tree will maintain the invariant that all leaves contain distinct URLs. However, it is also possible to have an association tree in which the same URL appears in multiple nodes. An association tree may optionally contain one or more internal nodes, each of which contains a URL that is an embedded object for some other base page, but which may also be fetched as a base page itself. Given a number of association trees and a base-page URL, a prefetch system finds the root or interior node corresponding to that URL (if any) and traverses the tree from that node, prefetching URLs until the URL of the last leaf node is prefetched. The prefetching starts the process of bringing over the various embedded objects before the user or program would ordinarily fetch them.

20 Claims, 3 Drawing Sheets

(56) References Cited

U.S. PATENT DOCUMENTS

| | | | |
|---|---|---|---|
| 6,212,565 B1 | 4/2001 | Gupta et al. | |
| 6,397,253 B1 | 5/2002 | Quinlan et al. | |
| 6,415,329 B1 | 7/2002 | Gelman et al. | |
| 6,473,406 B1 | 10/2002 | Coile et al. | |
| 6,487,538 B1 | 11/2002 | Gupta et al. | |
| 6,598,081 B1 | 7/2003 | Coile et al. | |
| 6,704,730 B2 | 3/2004 | Moulton et al. | |
| 6,721,780 B1 | 4/2004 | Kasriel et al. | |
| 6,772,193 B1 | 8/2004 | Igawa et al. | |
| 6,874,017 B1 | 3/2005 | Inoue et al. | |
| 6,940,835 B2 | 9/2005 | Reza et al. | |
| 6,973,485 B2 | 12/2005 | Ebata et al. | |
| 6,981,029 B1 | 12/2005 | Menditto et al. | |
| 7,047,485 B1 | 5/2006 | Klein et al. | |
| 7,161,947 B1 | 1/2007 | Desai | |
| 7,316,028 B2 | 1/2008 | Donatelli et al. | |
| 2001/0051927 A1 | 12/2001 | London et al. | |
| 2002/0010798 A1 | 1/2002 | Ben-Shaul et al. | |
| 2002/0062384 A1 | 5/2002 | Tso | |
| 2002/0087547 A1 | 7/2002 | Kausik et al. | |
| 2002/0091801 A1 | 7/2002 | Lewin et al. | |
| 2002/0112069 A1 | 8/2002 | Sim | |
| 2002/0138511 A1 | 9/2002 | Psounis et al. | |
| 2002/0156911 A1 | 10/2002 | Croman et al. | |
| 2002/0157019 A1 | 10/2002 | Kadyk et al. | |
| 2002/0194382 A1* | 12/2002 | Kausik et al. | 709/246 |
| 2003/0043844 A1 | 3/2003 | Heller | |
| 2003/0055826 A1 | 3/2003 | Graham | |
| 2003/0079041 A1 | 4/2003 | Parrella, Sr. et al. | |
| 2003/0115488 A1 | 6/2003 | Kunito et al. | |
| 2003/0163646 A1 | 8/2003 | O'Neil | |
| 2005/0044242 A1 | 2/2005 | Stevens et al. | |
| 2006/0026386 A1* | 2/2006 | Freedman et al. | 711/213 |
| 2007/0005786 A1 | 1/2007 | Kumar et al. | |
| 2007/0038645 A1 | 2/2007 | Koskas | |
| 2007/0061339 A1* | 3/2007 | Douglet et al. | 707/10 |
| 2007/0250601 A1* | 10/2007 | Amlekar et al. | 709/219 |

FOREIGN PATENT DOCUMENTS

| | | | |
|---|---|---|---|
| JP | 2004/348495 A | 12/2004 | |
| WO | 95/20793 A | 8/1995 | |
| WO | 00/13110 A | 3/2000 | |
| WO | 01/80022 A | 10/2001 | |
| WO | 02/54699 A | 7/2002 | |

OTHER PUBLICATIONS

PCT Written Opinion for PCT Appln No. US 08/56431; mailed Aug. 6, 2008 (5 pages).

Amer, Ahmed et al., "File Access Prediction with Adjustable Accuracy," 2002, *Proceedings of the Performance, Computing, and Communications Conference 2002*, on 21st IEEE International, pp. 131-140.

Caceres, Ramon et al., "Web Proxy Caching: The Devil is in the Details," Jun. 1998, *Proceedings of the Workshop on Internet Server Performance*, Madison, Wisconsin, pp. 111-118.

Deshpande, Mukund et al., "Selective Markov Models for Predicting Web-Page Accesses," 2004, *ACM Transactions on Internet Technology*, vol. 4, Issue 2, pp. 163-184.

Fan, Li et al., "Summary Cache: A Scalable Wide-Area Web Cache Sharing Protocol," Jun. 2000, *Proceedings of the IEEE/ACM Transactions on Networking*, vol. 8, No. 3, pp. 281-293.

Feldmeier, D.C. et al., "Protocol Boosters," Apr. 1998, IEEE JSAC, vol. 16, Issue No. 3, pp. 437-444.

Griffioen, James et al., "Automatic Prefetching in a WAN," Oct. 1993, *Proceedings of the IEEE Workshop on Advances in Parallel and Distributed Systems*, Technical Report # CS243-93, pp. 8-12.

Griffioen, James et al., "Reducing File System Latency using a Predictive Approach," Jun. 1994, *Proceedings of the USENIX Summer 1994 Technical Conference on USENIX Technical Conference*, vol. 1.

Lei, Hui et al., "An Analytical Approach to File Prefetching," Jan. 1997, *Proceedings of the Annual Conference on USENIX Annual Technical Conference*, Anaheim, California, pp. 1-12.

Oly, James et al., "Markov Model Prediction of I/O Requests for Scientific Applications," Jun. 2002, *Proceedings of the 16th International Conference on Supercomputing*, pp. 147-155.

Padmanabhan et al., "Using Predictive Prefetching to improve World Wide Web latency," Jul. 1996, *ACM SIGCOMM Computer Communication Review*, vol. 26, No. 3, pp. 22-36.

Rhea, Sean C. et al., "Value-Based Web Caching," May 2003, *Proceedings of the 12th International Conference on World Wide Web*, Budapest, Hungary, pp. 619-628.

Tolia, Niraj, et al., "An Architecture for Internet Data Transfer," May 2006, *Third Symposium on Networked Systems Design and Implementation* (NSDI'06), San Jose, California.

Yang, Qiang et al., "Mining Web Logs for Prediction Models in WWW Caching and Prefetching," Aug. 2001, *Proceedings of the Seventh ACM SIGKDD International Conference on Knowledge Discovery and Data Mining KDD'01*, San Francisco, California, pp. 473-478.

Factor, Michael et al., "Compression in the Presence of Shared Data," *International Journal of Computing and Information Sciences*, Jun. 2001, pp. 29-41, vol. 135, Issue 1-2.

Housel, B. C. et al., "Emulator Express: A System for Optimizing Emulator Performance for Wireless Networks," *IBM Systems Journal*, 2000, pp. 384-402, vol. 39, Issue 2.

Knutsson, Bjorn et al., "Transparent Proxy Signalling," 1999, *Department of Information Technology; Department of Comuter Systems*, Journal of Communications and Networks, vol. 3, No. 2, University of Uppsala, Uppsala. Sweden, pp. 164-174.

Kahol et al., "A Strategy to Manage Cache Consistency in a Disconnected Distributed Network," IEEE. Transactions on Parallel and Distributed Systems, Jul. 2001, pp. 686-700, vol. 12, Issue 7, IEEE Computer Society. Los Alamitos, California, USA.

White, J., "Supply Chain Responsivebess", BRITVIC Soft Drinks, Carrow, Norvich, (Feb. 23, 1998), XP006506548.

European Office Action received Jul. 19, 2010 in related European Application No. 05736807.8.

\* cited by examiner

METHOD AND APPARATUS FOR ACCELERATION BY PREFETCHING ASSOCIATED OBJECTS

CROSS-REFERENCE TO RELATED APPLICATIONS

The present application claims benefit under 35 USC §119(e) of U.S. Provisional Application No. 60/894,180, filed Mar. 9, 2007, entitled "Method and Apparatus for Acceleration by Prefetching Associated-Objects", the content of which is incorporated herein by reference in its entirety.

The present disclosure may be related to the following commonly assigned applications/patents:

U.S. patent application Ser. No. 10/640,405, filed Aug. 12, 2003, entitled "Transparent Client-Server Transaction Accelerator" (hereinafter "McCanne III"), U.S. patent application Ser. No. 10/640,562, filed Aug. 12, 2003, entitled "Cooperative Proxy Auto-Discovery and Connection Interception" (hereinafter "McCanne IV"), U.S. patent application Ser. No. 10/640,459, filed Aug. 12, 2003, entitled "Content Delivery for Client-Server Protocols with User Affinities using Connection End-Point Proxies" (hereinafter "McCanne V"), and U.S. patent application Ser. No. 11/489,414, filed Jul. 18, 2006, entitled "Split Termination for Secure Communication Protocols" (hereinafter "Day").

The respective disclosures of these applications/patents are incorporated herein by reference in their entirety for all purposes.

FIELD OF THE INVENTION

The present invention relates to networking processes in general and in particular to efficient requesting and transport of data, such as objects, over networks.

BACKGROUND OF THE INVENTION

A network is typically used for data transport among devices at network nodes distributed over the network. A node is defined as a connection in the network. Devices can be connected to network nodes by wires or wirelessly. Networks can be local area networks which are physically limited in range such as wired or wireless data networks in a campus, in an office building, or a wide-area network employing public infrastructures such as the public switched telephone networks or cellular data networks.

Data transport is often organized into transactions, wherein a device at one network node initiates a request for data from another device at another network node and the first device receives the data in a response from the other device. By convention, the initiator of a transaction is referred to herein as the client and the responder to the request from the client is referred to herein as the server.

In a client-server structured network operation, clients send requests to servers and the servers return data objects that correspond to those requests. A transaction might begin with a client at one node making a request for file data directed to a server at another node, followed by a delivery of a response containing the requested file data. In the Web environment, web clients effect transactions to Web servers using the Hypertext transfer Protocol (HTTP), which enables clients to access files (e.g., text, graphics, sound, images, video, etc.) using a standard page description language. One example of the predominant markup language for web pages is the Hypertext Markup language (HTML). Markup language data streams typically include numerous references to embedded objects which can be image, sound, video files or Web pages and components of those Web pages. Data objects might be identified by their uniform resource locator (URL). Generally, URL is a character string identifying both the location of the site and a page of information at that site. For example, "http://www.riverbed.com" is a URL. Each web site stores at least one, and often times substantial more pages. Pages, in this context, refer to content accessed via a URL.

A Web browser is a software application which enables a user to display and interact with text, images, videos, music and other information typically located on a Web page at a website on the World Wide Web or on a public or private local are network. Web browsers are the most commonly used type of HTTP user agent. Web browsers communicate with Web servers primarily using HTTP to fetch Web pages. The combination of HTTP content type and URL protocol specification allows Web page designers to embed objects such as images, videos, music and streaming media into a Web page. In practice, it is useful to distinguish between base pages and embedded objects. A user or program action (e.g., an HTTP request sent from an HTTP client) to fetch a particular URL from an HTTP server typically identifies only the base page and that base page then typically contains some number of other links to embedded objects. Typical examples of such embedded objects are images, scripts, cascading style sheets, and the like. Logically, the request for the base page implicitly also requests the embedded objects. In implementation, the base page is fetched and that page contains the information required to fetch the embedded objects. The program processing the initial base page request (for example a Web browser acting as an HTTP client) then uses the information in the base page to fetch the embedded objects. As these fetches are mostly in a serial fashion over a few connections, they result in additional round-trips to the server(s) providing the objects. Particularly in cases where the round-trip time (RTT) is high, these additional fetches lead ultimately to poor end-user experience in which pages are displayed slowly or in a fragmented way.

One possible approach to enhance user experience is to fetch the embedded objects at the same time as the base page fetch. For example, a proxy is placed between clients and servers and selectively preloads data for the clients. The proxy can watch and record patterns of interaction. When a client's fetches start to match a previously-seen pattern, the proxy can then play out the rest of the recorded pattern as a speculative effort to anticipate the client's future behavior. This might be implemented, for example, using the teachings of McCanne V in the context of web pages and HTTP.

In some applications, the proxies function as performance-enhancing intermediary between the clients and the servers. The proxies may transparently intercept, forward, modify, or otherwise transform the transactions as they flow from the client to the server and vice versa. Such proxies address the network throughput issue in the transport or application-level, as described in McCanne III and McCanne IV. Such a solution should be compatible with acceleration for secure transports such as SSL, such as that described in Day.

There are other considerations however. In order to determine which embedded objects should be fetched along with a base page, a proxy would need accurate knowledge of the association between the base page and its embedded objects. In an environment where a network/HTTP proxy receives a variety of HTTP traffic from different clients and servers, the proxy cannot easily establish an association between the embedded objects and their base pages. One reason is that base pages may contain many embedded objects, and some embedded objects are themselves web pages that may further contain embedded objects (e.g., a directory listing). It can take substantial time to parse (analyze) and classify all of them.

Another reason for this is that the HTTP protocol is stateless, so logically each client/server interaction is distinct. When considering two HTTP requests from the same client, those two requests may be addressed to the same server or different servers. They may be sequential (no intervening requests) or they may be separated (other intervening requests), and they may be related or unrelated. There is no reliable connection between these attributes in that neither the rank order nor the identity of servers can be relied upon to determine which of these interactions are grouped together. Without some reliable form of grouping, it is not possible or easy to learn associations among requests and reuse those associations for subsequent prefetching.

There have been some attempts to solve such problems, such as through the use of caching, page parsing, Markov models, or other approaches.

With a caching approach, the content (page or object) associated with a particular URL is retained in storage (called a cache) near the client. The stored (cached) content is served from the cache when a matching URL is requested, rather than forwarding the request on to the server. While this works well when the matching URL refers to matching content, caching performs poorly when URLs refer to dynamic content. If the content associated with a URL changes, a cache may serve an old, incorrect version. This kind of error is sometimes referred to as a freshness or consistency problem.

Various approaches to fix this problem attempt to set freshness intervals or explicit invalidations when content changes, but these have problems of their own. It is difficult to select good values for freshness timers, and any choice still forces a tradeoff between consistency and overhead. Explicit invalidation requires the resolution of difficult issues about control, autonomy, and scale, because a change at a server causes the discarding of many cached copies. In the limiting case, caching is simply useless for content where every fetch of a given URL yields a different value—such as a URL for a real-time clock. Nonetheless, it is important to be able to accelerate a complex page that includes one or more such embedded dynamic URLs.

With a page parsing approach, a proxy examines a base page as it is passing from the server to the client and simply follows links. In its simplest form, the proxy simply fetches all URLs found on the page. Some common refinements include parameters to control the depth or breadth of such prefetching, or the use of heuristics to focus additional prefetching effort on certain kinds of links while ignoring others.

Simple page parsing systems are often worse than avoiding prefetching entirely, as they can prefetch vast quantities of irrelevant information, consuming network and server resources for little benefit. More sophisticated page parsing systems are complex collections of heuristics, and suffer from the usual problems of adaptation and maintainability for such systems. That is, at a certain level of complexity with multiple interacting heuristics, it becomes difficult to determine whether a new heuristic is actually improving performance. The complexity of the parsing process is also increasing over time, as HTML base pages increasingly use embedded objects such as cascading style sheets to control which parts of the page are presented and thus which other embedded objects need to be fetched.

With a Markov models approach and similar learning approaches, there is an assumption of repeating patterns of access and the proxy may build statistical models over time to determine when the start of a previously-seen sequence is likely to match other previously-fetched URLs. However, because of the previously-mentioned statelessness of HTTP and the difficulty of grouping URLs at a proxy, many sequences of URLs seen at the proxy may represent meaningless differences in interleaving of repeating sequences. To successfully learn the sequences despite the changes in interleaving, a Markov model may require a very large state space and correspondingly long learning time. In general, this brute-force approach is intractable since the complexity of the learning increases exponentially with increases in the length of sequences and number of interleaved sequences.

In view of the above, what is needed is an improved approach for associating embedded objects with base pages that is usable in a proxy and more effective than prior approaches.

SUMMARY OF THE INVENTION

As stated above that HTTP is stateless, i.e., a client does not store information regarding a completed request with a server. But often it is desirable for the server to have client state information. In embodiments according to the present invention, associations between a base page and its embedded objects are done more effectively using a Referrer-based approach from a client to a proxy or a cookie-based approach from the proxy to the client. In either approach, subsequent requests by the client to the server contains information that can be used by a proxy to relate them to the base page. As consequence, the prefetching will be performed more effectively.

In both approaches, the association information is used to build association trees. An association tree has a root node containing a URL for a base page, and zero or more internal and/or leaf nodes, each internal or leaf node contains a URL for an embedded object. In most cases, an association tree will maintain the invariant that all leaf nodes contain distinct URLs. However, it is also possible to have an association tree in which the same URL appears in multiple nodes. An association tree may optionally contain one or more internal nodes, each of which contains a URL that is an embedded object for some other base page, but which may also be fetched as a base page itself. Given a number of association trees and a base-page URL, a prefetch system finds the root or internal node corresponding to that URL (if any) and traverses the tree from that node, prefetching URLs until the URL of the last leaf node is prefetched. The prefetching starts the process of bringing over the various embedded objects before the user or program would ordinarily fetch them, and thus provide an improved user experience through less time spent waiting for those objects to be fetched, among other advantages.

Variations in tree traversal (depth-first, breadth-first, and various hybrid strategies) and various ways to limit or weight the tree traversal are all well-known to those practiced in the arts, so they need not be described in great detail and their use with the teachings of this disclosure should be apparent to one or ordinary skill in the art upon reading this disclosure.

With the Referrer-based approach, the proxy receives a request containing a Referrer field. The referrer is part of the HTTP request sent by the client to the web server and contains the URL of the previous web page from which a link was followed. The client is indicating an association between the embedded object and its base page, and this association can be directly recorded in the association tree. If there is a root node containing the specified URL, the embedded object's URL is added to the leaf nodes reachable from that root node. This addition or insertion process may involve duplicate elimination, rebalancing, rotating, or splitting of the tree, and/or other data-structure-specific operations and/or use-specific operations that are well-known to those practiced in the arts.

With the cookie-based approach, the proxy receives a request that does not contain a Referrer field. The proxy effectively forces the client to behave in a similar way to a Referrer field by using cookies. A cookie is a small file stored at a client that contains server-specific information and is used to overcome the statelessness of HTTP across a sequence of logically-related interactions. In general, when a server sets a cookie, the client then provides the cookie to the server on subsequent interactions. In this technique, the server does not set the cookie; instead, the proxy does. Upon receiving the base page response headers, the proxy rewrites the response headers so as to inject an additional Set-Cookie response header containing a proxy-specific tag. The client does not know that this cookie is from the proxy, and behaves as though it were a cookie from the server. Accordingly, each subsequent embedded object fetch from that base page should contain a cookie request header bearing the same specific tag. Effectively, the cookie is an indirect form of the Referrer URL: each proxy-specific tag used in a cookie maps to the URL of the base page whose response headers were modified to set the cookie. So rather than looking up the Referrer URL directly to find an association tree with that URL as its root, the cookie tag is first mapped to the associated URL. That URL is then used to find an association tree with that URL as its root node. If there is a root node containing the specified URL, the embedded object's URL is added to the leaf nodes reachable from that root node. This addition or insertion process may involve duplicate elimination, rebalancing, rotating, or splitting of the tree, and/or other data-structure-specific operations and/or use-specific operations that are well-known to those practiced in the arts.

The following detailed description together with the accompanying drawings will provide a better understanding of the nature and advantage of the present invention.

DESCRIPTION OF THE DRAWINGS

FIG. 2a shows that the proxy only relays the requests from client 210 to server 230 which duly responds by sending the requested base pages.

FIG. 2b shows a Referrer-based method in accordance with one embodiment of the present invention.

FIG. 2c shows a cookie-based method in accordance with another embodiment of the present invention.

DETAILED DESCRIPTION OF THE INVENTION

The present invention relates to efficient fetching of embedded World Wide Web objects, among other concepts and structures.

Figure 1:
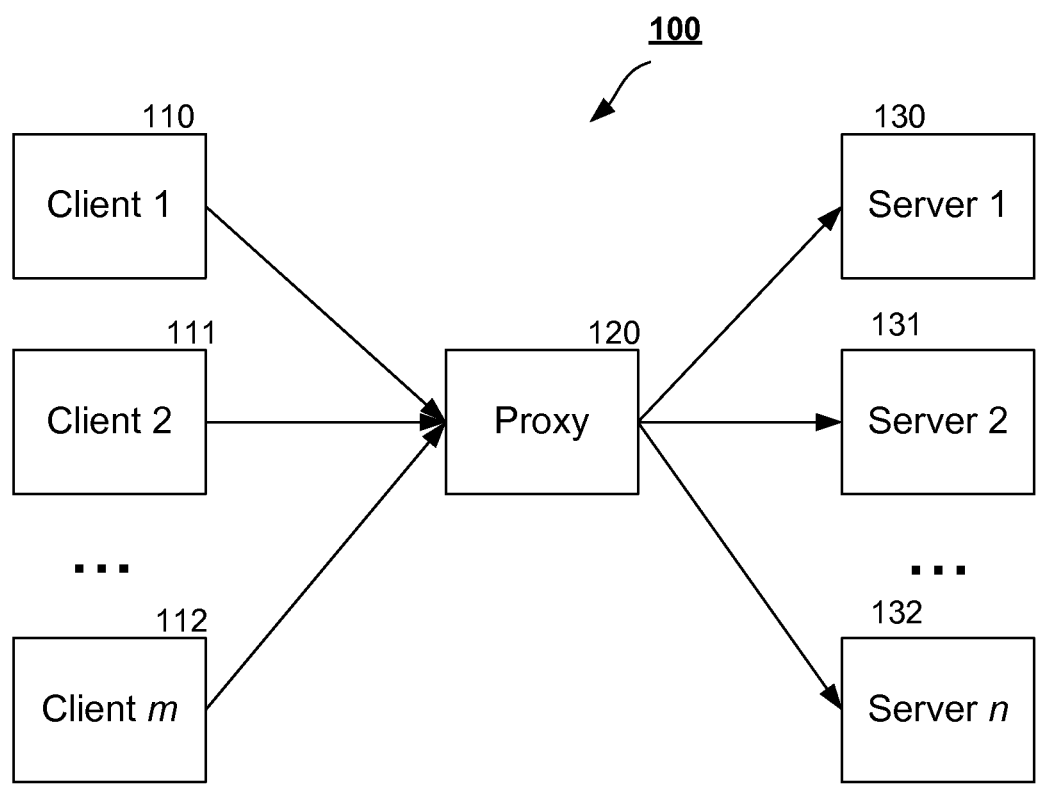
FIG. 1 is a high-level block diagram of a typical client-server communication system via a proxy.

FIG. 1 shows an arrangement 100 of clients 110, 111, 112 and servers 130, 131, 132 communicating via a proxy 120. The proxy 120 may be nearer to the clients, or nearer to the servers, or may be a logical proxy whose physical implementation is composed of multiple physical devices cooperating to deliver a proxy's functionality; those multiple cooperating physical devices may be located near clients, near servers, or in unrelated locations.

The clients 110, 111, 112 are depicted so as to convey a plurality of clients: there may be as few as one or many more clients than the ones depicted. Likewise, the servers 130, 131, and 132 are depicted so as to convey a plurality of servers. There may be more servers than clients or vice-versa; as suggested by "client m" 112 and "server n" 132, there is no necessary relationship between the numbers of clients and servers.

The communication patterns shown in FIG. 1 are from clients to servers for simplicity, but actual communication patterns are bidirectional between clients and servers. That is, information also flows from servers to clients, not only from clients to servers. Referring to FIG. 1, each client is coupled to proxy 120 using a client communication path, such as a local area network (LAN), a wireless local area network (WLAN), a wide area network (WAN), a cellular link or some combination thereof. Similarly, each server is also coupled to proxy 120 using a LAN, a WLAN, a WAN, a cellular link or some combination thereof. In a preferred embodiment, the client communication path includes a LAN, while the server communication path includes a network of networks such as Internet or intranet. Each client can be a desktop PC, a laptop, a notebook, or a mobile handheld device. Proxy 120 comprises a CPU, program and data memory, mass storage, input/output (I/O) units, and network I/O units.

FIG. 1 illustrates a problem of proxy 120: it has a large collection of client/server communications flowing through, only some of which are related. For efficient prefetching, the proxy must learn which of these client/server interactions are actually related, and record that information accordingly.

FIG. 2 shows three different interaction patterns between a client 210, proxy 220, and server 230.

Figure 2A:
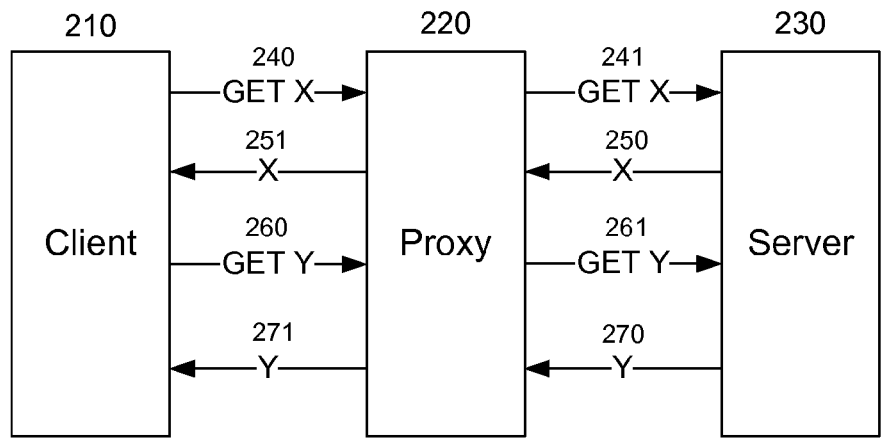
FIGS. 2a-c show three different interactions between a client, a proxy and a server.

In the pattern illustrated in FIG. 2a, the proxy sees the client request two objects X and Y, which the server duly delivers. However, there is not enough information in this interaction to determine whether the fetch of Y is related to the earlier fetch of X.

Client 210 issues request 240 to fetch X, which is then passed along by proxy 220 as request 241 to server 230. Server 230 returns response 250 including object X, which is then passed along by proxy 220 as response 251 to client 210. A similar pattern applies for the fetch of object Y: Client 210 issues request 260 to fetch Y, which is then passed along by proxy 220 as request 261 to server 230. Server 230 returns response 270 including object Y, which is then passed along by proxy 220 as response 271 to client 210. This interaction pattern is identical at proxy 220 regardless of whether X and Y are related or unrelated.

Figure 2B:
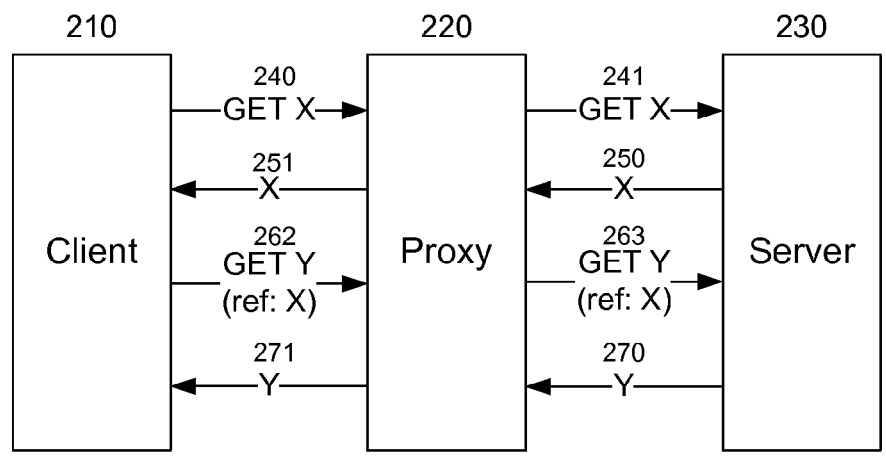

In the pattern illustrated in FIG. 2b, the proxy 220 initially receives and sends the requests and responses for object X as in the pattern of FIG. 2a. In the request X, the referrer header field does not have any information; for this reason, the proxy 220 treats the request 240 as the beginning of a new transaction. But when the client 210 requests object Y, it sends request 262 in which it not only requests Y but also indicates that the referrer object is X. Proxy 220 forwards the identical information to the server 230 as request 263, but is able to take advantage of the referrer information to record object Y as associated with object X. Note that the responses 270, 271 are identical in FIG. 2b to what is shown in FIG. 2a. Subsequent requests from the client 210 to the server following request Y will be treated by the proxy 220 similarly: the proxy 220 will check the referrer header and build an association tree accordingly. For example, the association will have the initial request X as the root node (base page), with request Y as an internal node (embedded object) and subsequent related requests as either another internal nodes or leaf nodes.

Figure 2C:
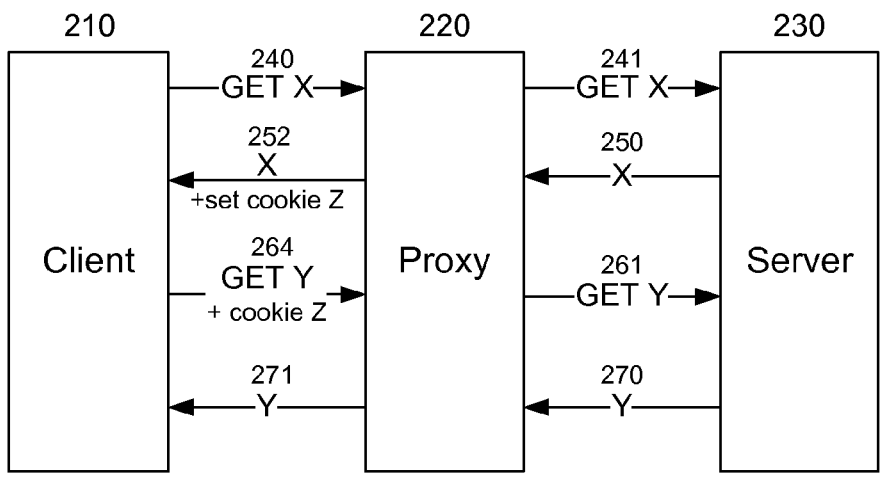

In the pattern illustrated in FIG. 2c, the proxy 220 likewise receives and sends the requests and responses for initial object X as in the example of FIG. 2a but when it is returning a response 252 for object X, it sets a cookie Z containing a unique tag that it can subsequently recognize. Client 210 will then use cookie Z for related requests to server 230. Request 264 shows an example of client 210 requesting object Y while also presenting cookie Z. Proxy 220 recognizes cookie Z and records the request for Y as related to the request for X. It then removes cookie Z from the request sent to server 230, since server 230 did not supply cookie Z and would not recognize cookie Z, even though from client 210 the cookie came from server 230. The remaining interactions 261, 270, 271 are identical to what is in the example shown in FIG. 2a.

Taken together, these diagrams show how proxy 220 can both take advantage of Referrer information when it is present and insert cookie tags when Referrer information is absent, so as to infer groupings among distinct requests.

Figure 3:
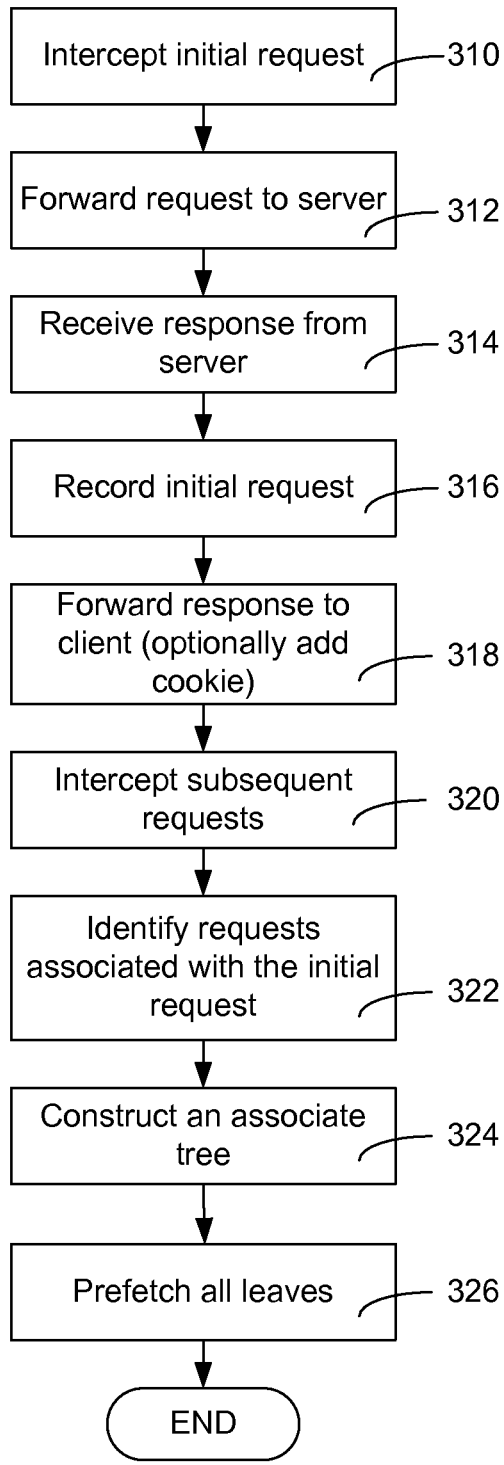
FIG. 3 is a flowchart illustrating a process of prefetching in accordance with one embodiment of the present invention.

FIG. 3 depicts a flowchart illustrating a client-side acceleration of transactions by prefetching associated objects in accordance with one embodiment of the present invention. In the illustrative embodiment of FIG. 2, this routine is implemented in computer software, namely as a set of program instructions, executed in a processor running on the proxy 220.

The routine 300 begins at step 310 when a client initial request is intercepted by the proxy. At step 312, the proxy forwards the request to origin server 230. At step 314, the proxy receives a response from the origin server. The response is a web page which may include a plurality of embedded objects. If the initial request is successfully answered by the origin server, the proxy records the initial request as a root node at step 316. The proxy at step 318 may take two different approaches. It can either forward the response directly back to the client (FIG. 2b) or add a tag (a cookie) containing server-specific information to the response prior to sending it back to the client 210 (FIG. 2c). At step 320, the routine 300 continues to intercept subsequent requests from the client and identifies at least one request that is associated with the initial request at step 322. The identification can be performed by parsing (examining) a portion of the HTTP header which contains either a referrer header field or the tag (cookie) previously inserted by the proxy at step 318. At step 324, the proxy constructs an associate tree having the initial request as the root node and subsequent associated requests as the internal or leaf nodes. At step 326, the proxy will prefetch web pages based on the thus constructed associate tree. Note that steps 320, 322, and 324 will be repeated many times to expand the associate tree. And step 326 ends when the last leaf node of the associate tree is prefetched.

A variety of initial requests can be classified as root nodes if they have the form of an endpoint URL such as "protocol// host_name:port_number" (e.g., "http:myHost:9045") or if they contain URL domain suffixes such as .com, .edu, .gov denoted for commercial, educational, government, or country suffices such as .au, .de, .uk denoted for Australia, Germany, and United Kingdom, respectively. Associate URLs to the base page will generally contain a character string of the base URL followed by some character attributes such as .index.html, .gif, etc.

While the invention has been described with respect to exemplary embodiments, one skilled in the art will recognize that numerous modifications are possible. For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A method of accelerating client-server transactions at a proxy, the method comprising:
    intercepting an initial request from a client;
    forwarding the initial request to an origin server;
    receiving a response from the origin server;
    recording the initial request as a root node;
    outputting the response to the client;
    intercepting subsequent requests from the client;
    identifying a first subsequent request associated with the initial request;
    constructing an associate tree having the root node and at least one leaf node which is coupled to that root node, wherein the at least one leaf node is associated with the identified first subsequent request, and the root node comprises a location for a base page;
    expanding the associate tree by adding leaf nodes associated with further subsequent requests from the client which have been intercepted and identified as being associated with the initial request; and
    performing a prefetching operation using the associate tree, wherein the prefetching operation includes prefetching the root node corresponding to the associate tree the leaf nodes corresponding to the associate tree.

2. The method of claim 1, wherein recording the initial request comprises successfully receiving a response from the origin server.

3. The method of claim 1, wherein outputting the response comprises inserting a tag in the response.

4. The method of claim 3, wherein the tag comprises a string of N characters, with N being an integer value including zero.

5. The method of claim 1, wherein identifying a first subsequent request further comprises:
    parsing an attribute embedded in a HTTP header;
    comparing the attribute with a portion of the recorded initial request; and
    obtaining a match.

6. A method of associating embedded objects with base pages at a proxy, the method comprising:
    classifying a request as a base page or as an embedded object wherein classifying comprises distinguishing requests based on structure of their prefixes, suffixes, or contained substrings;
    detecting a containment attribute on a request for an embedded object;
    extracting a base page identification from the containment attribute;
    grouping the embedded object with the base page identified in the extracting step;
    marking a response with one or more distinctive tags representing a grouping from the grouping step, wherein marking includes adding the one or more distinctive tags to the response;
    detecting the one or more distinctive tags in a subsequent request, wherein information in the one or more distinctive tags is used by the proxy to relate the subsequent request to the base page;

wherein grouping the embedded object comprises building a tree data structure using the information in the one or more distinctive tags, the tree data structure comprises a root node and at least one leaf node;

wherein the base page identification is at the root node, and the information in the subsequent request that is used by the proxy to relate the subsequent request to the base page is associated with a leaf node.

7. The method of claim 6, wherein classifying a request comprises distinguishing a request by the structure or content of the request, such as by suffix, prefix, or contained substring.

8. The method of claim 6, wherein detecting a containment attribute comprises finding an HTTP Referrer header.

9. The method of claim 6, wherein detecting a containment attribute comprises finding an HTTP Cookie field with a value generated by the proxy.

10. The method of claim 6, wherein extracting the base page identification comprises reading a URL or other identifier from a particular header of the request.

11. The method of claim 6, wherein extracting the base page identification comprises reading a key from a particular header of the request and finding an associated URL value from a key-value data structure.

12. The method of claim 6, wherein grouping the embedded object further comprises building a tree data structure where the embedded object is at least one leaf node.

13. The method of claim 6, wherein marking a response comprises setting an HTTP cookie with a distinct value that is recognizable in subsequent interactions.

14. A proxy interposed between at least one client and at least one server for accelerating client-server transactions, the proxy comprising:

a processor including memory modules and mass storage units;

program instructions which when executed by the processor, cause the proxy to perform the steps of intercepting requests issued from a client, classifying the requests, recording a base page, constructing an associate tree having one or more root nodes and at least one leaf node, wherein a first root node of the one or more root nodes is associated with an initial request and comprises a location for the base page, and the at least one leaf node is coupled to at least one of the root nodes and comprises a subsequent request associated with the initial request, and expanding the associate tree by adding leaf nodes associated with further subsequent requests from the client which have been intercepted and identified as being associated with the initial request; and program instructions which when executed by the processor, cause the proxy to perform the steps of performing a prefetching operation using the associate tree, wherein the prefetching operation includes prefetching objects based on the associate tree.

15. The proxy of claim 14, wherein the classifying the requests comprises distinguishing the requests based on the structure of their prefixes, suffixes, or contained substrings.

16. The proxy of claim 14, wherein recording the first base page further comprises:

receiving a successful response from an origin server, wherein the successful response corresponds to the initial request;

adding a tag to the successfully received response; and outputting the response with the added tag to the client.

17. The proxy of claim 16, wherein the initial request is a root node of the associate tree.

18. The proxy of claim 16, wherein the tag comprises a string of N characters.

19. The proxy of claim 18, wherein N is an integer value including zero.

20. The proxy of claim 14, wherein the prefetched objects are stored in the memory units or mass storage units.

* * * * *